(12) United States Patent
Capewell

(10) Patent No.: US 6,386,482 B1
(45) Date of Patent: May 14, 2002

(54) DETECTION APPARATUS

(75) Inventor: Richard S Capewell, Wolverhampton (GB)

(73) Assignee: Lucas Industries Limited (GB)

( * ) Notice: Subject to any disclaimer, the term of this patent is extended or adjusted under 35 U.S.C. 154(b) by 0 days.

(21) Appl. No.: 09/505,535

(22) Filed: Feb. 17, 2000

(30) Foreign Application Priority Data

Feb. 17, 1999 (GB) ................................ 9903500

(51) Int. Cl.$^7$ .................................................. B64C 1/00
(52) U.S. Cl. .................................................... 244/129.1
(58) Field of Search ........................... 73/514.26, 425.5; 340/429, 426; 244/129.1, 1 R, 228

(56) References Cited

U.S. PATENT DOCUMENTS

| | | | |
|---|---|---|---|
| 4,321,463 A | * | 3/1982 | Stecher .................... 250/227 |
| 4,450,434 A | | 5/1984 | Nielsen et al. |
| 4,710,353 A | * | 12/1987 | Tanaka et al. ............... 422/68 |
| 4,816,728 A | | 3/1989 | Kurakake |
| 4,931,771 A | * | 6/1990 | Kahn ....................... 340/556 |
| 5,144,125 A | * | 9/1992 | Carter et al. ........... 250/227.15 |
| 5,152,508 A | | 10/1992 | Fish |
| 5,639,968 A | * | 6/1997 | Bobb et al. .................. 73/800 |
| 5,680,124 A | | 10/1997 | Bedell et al. |
| 5,719,566 A | | 2/1998 | Readman et al. |
| 5,965,876 A | * | 10/1999 | Anemogiannis et al. ................. 250/227.15 |
| 5,965,877 A | * | 10/1999 | Wood et al. ........... 250/227.15 |
| 6,204,920 B1 | * | 3/2001 | Ellerbrock et al. ......... 356/345 |
| 6,224,022 B1 | * | 5/2001 | Barba ........................ 244/228 |

FOREIGN PATENT DOCUMENTS

| | | |
|---|---|---|
| EP | 0 726 201 | 8/1996 |
| FR | 2 615 944 | 12/1988 |

\* cited by examiner

*Primary Examiner*—Peter M. Poon
*Assistant Examiner*—Kevin Jakel
(74) *Attorney, Agent, or Firm*—Andrus, Sceales, Starke & Sawall

(57) ABSTRACT

A detection apparatus for use with a system having a plurality of moveable surfaces, the apparatus comprising a signal transmission apparatus extending across each surface, a signal generator and a signal receiver. The apparatus further comprises a signal interrupter associated with adjacent ones of the surfaces and arranged to interrupt the transmission of a signal along the signal transmission apparatus upon relative movement of the adjacent ones of the surfaces occurring. The invention also relates to a leading edge high lift system of an aircraft wing having a plurality of moveable leading edge high lift surfaces.

12 Claims, 3 Drawing Sheets

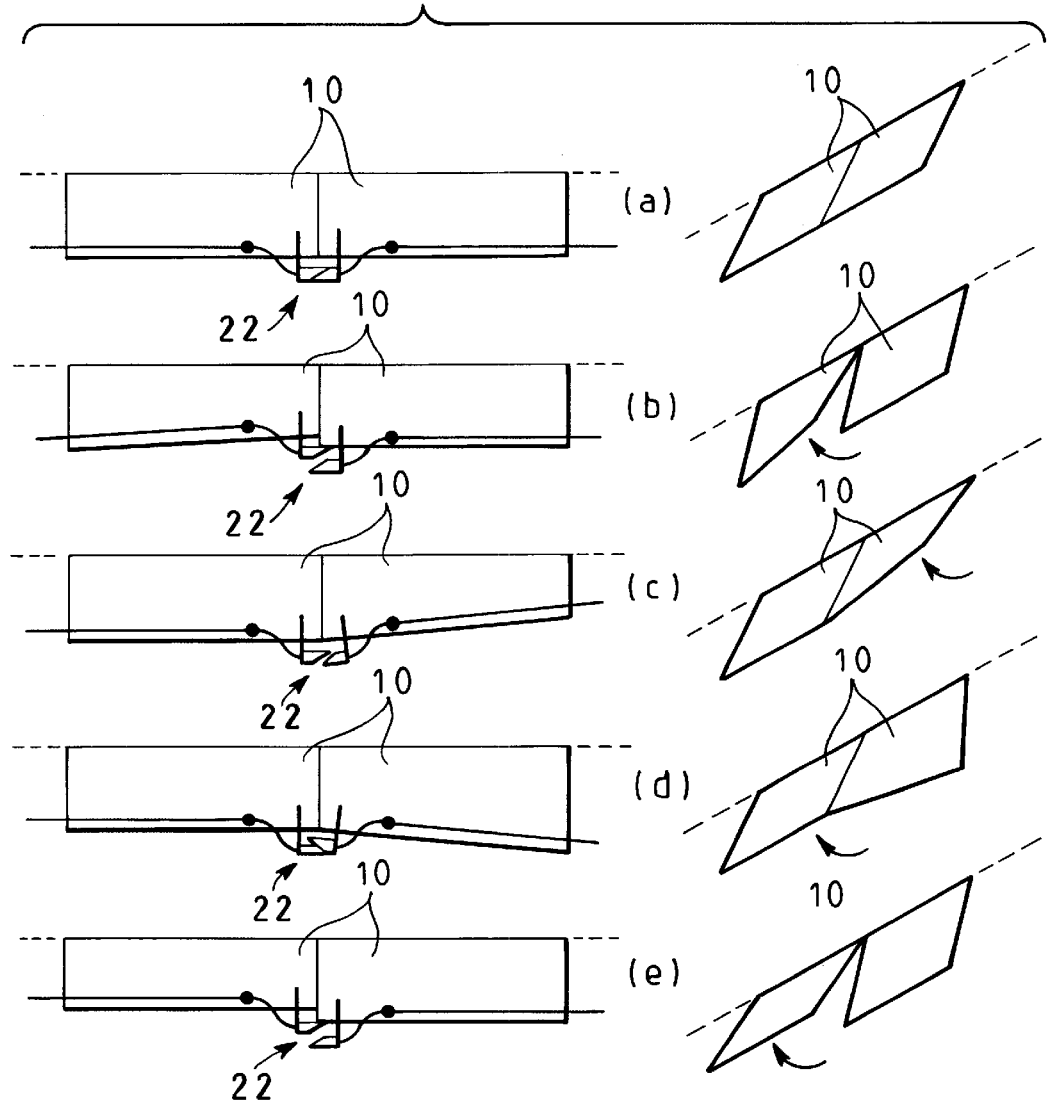

DETECTION APPARATUS

This invention relates to a detection apparatus suitable for use in detecting the presence of skew or asymmetry in one or more of the leading edge high lift surfaces of a leading edge high lift surface system of an aircraft wing. The apparatus may also be suitable for use in other applications.

Leading edge high lift surface systems are used to vary the camber of the leading edge of an aircraft wing, thus altering the effective shape of the aerofoil defined by the wing. As a result, for a given airspeed and angle of attack, the level of lift which can be achieved can be varied as the effective curvature of the wing can be changed by a small amount. Further, a greater angle of attack can be attained prior to stall. Typically, the leading edge high lift surfaces are used during landing to permit sufficient levels of lift to be generated at reduced airspeeds, and during takeoff to achieve more lift with a steeper climb.

Each aircraft wing is typically provided with several leading edge high lift surfaces. Each surface is typically moved or adjusted using two actuators, the actuators of each surface being driven by a common drive arrangement. In the event of the failure of one of the actuators associated with one of the surfaces, that surface will become skewed. As a result, the angle of attack which can be maintained by the wing for a given airspeed without stalling will change. It is an object of the invention to provide an apparatus permitting the detection of such a skewed surface, thereby permitting appropriate remedial action to be taken.

If both of the actuators associated with one of the surfaces fail, then that surface will not move when the remaining surfaces move. Such a situation is known as an asymmetry and is undesirable for the reasons discussed hereinbefore in relation to skewed surfaces and it is desirable to permit the detection of such an asymmetry.

According to the present invention there is provided a detection apparatus for use with a system having a plurality of moveable surfaces, the apparatus comprising signal transmission means extending across each said surface, a signal generator, a signal receiver and signal interruption means associated with adjacent ones of the said surfaces and arranged to interrupt the transmission of a signal along the signal transmission means upon relative movement of the adjacent ones of the surfaces occurring.

The apparatus is particularly suitable for use with a leading edge high lift system of an aircraft wing having a plurality of moveable leading edge high lift surfaces.

The signal interruption means is conveniently arranged to permit a small amount of relative movement between adjacent surfaces without interrupting the transmission of a signal along the signal transmission means.

The signal transmission means may comprise an optical fibre, or alternatively may comprise an electrically conductive wire. The signal transmission means is conveniently provided with a protective sleeve.

The signal transmission means may be composed of a plurality of segments, each segment extending across a respective one of the surfaces, the signal interruption means comprising plug and socket arrangements arranged to become disconnected upon relative movement of adjacent surfaces occurring.

Alternatively, the signal transmission means may be continuous, the signal interruption means being arranged to break the signal transmission means in the event of relative movement of adjacent ones of said surfaces occurring.

Preferably, the signal interruption means comprises a first component carried by a bracket associated with one of the surfaces, and a second component carried by a bracket associated with an adjacent one of the surfaces. The brackets are conveniently provided with slots within which the components can slide to permit a limited amount of relative movement of the surfaces to occur without interrupting the signal.

The components are conveniently rotatable relative to the brackets and are conveniently arranged to cooperate with one another along a plane angled relative to the axes of the components.

In such an apparatus, upon a significant level of relative movement of adjacent surfaces occurring, the signal interruption means prevents the transmission of signals along the transmission means. Upon the receiver failing to receive a signal transmitted by the signal generator, a warning signal indicative of the presence of a skew or asymmetry is produced whereon appropriate remedial action can be taken to minimize the effect of the skew or asymmetry.

The invention will further be described, by way of example, with reference to the accompanying drawings, in which:

FIG. 3 is a diagram illustrating operation of the apparatus.

Figure 1:
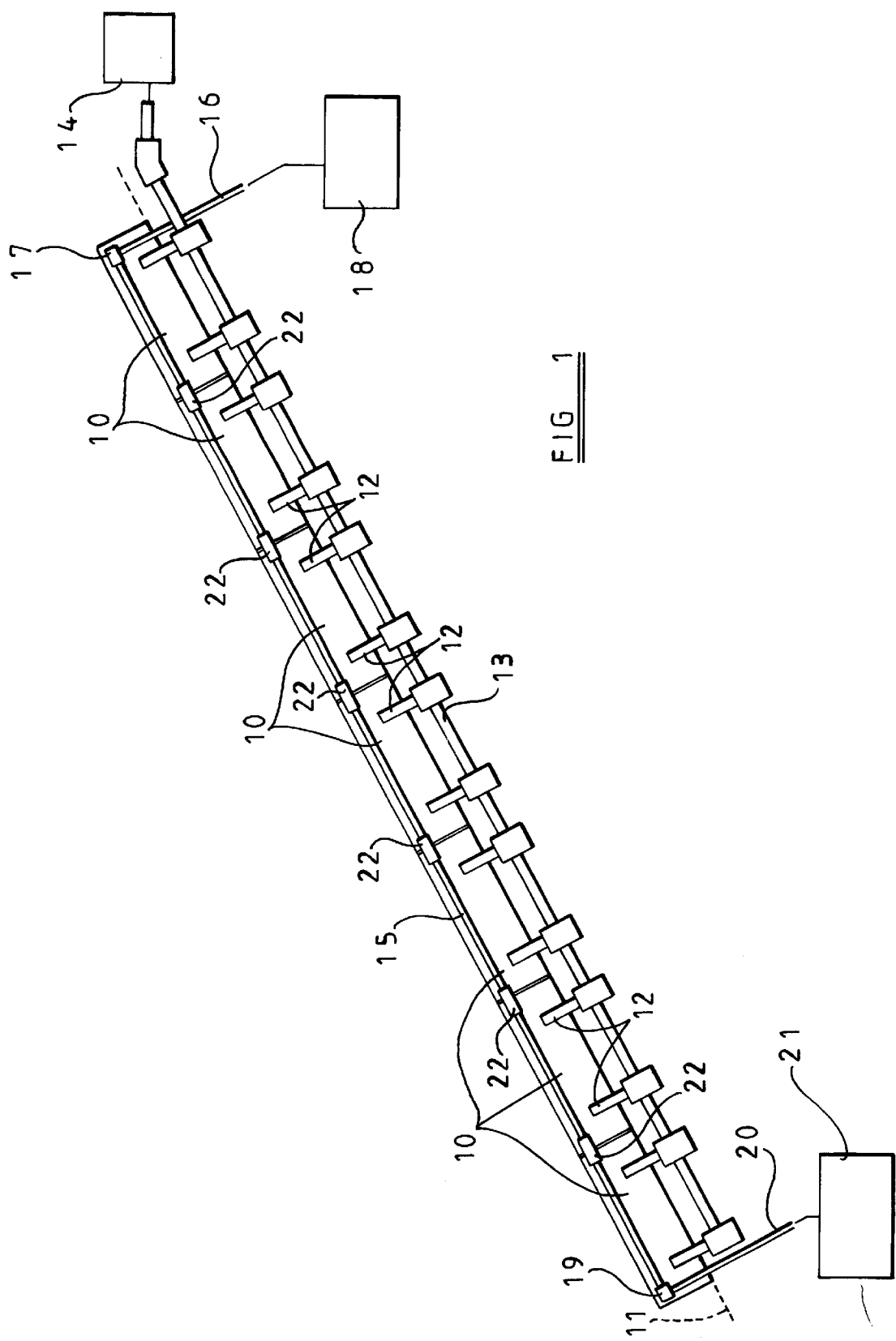
FIG. 1 is a diagram illustrating a detection apparatus in accordance with an embodiment of the invention installed upon a leading edge high lift surface system.
Figure 2:
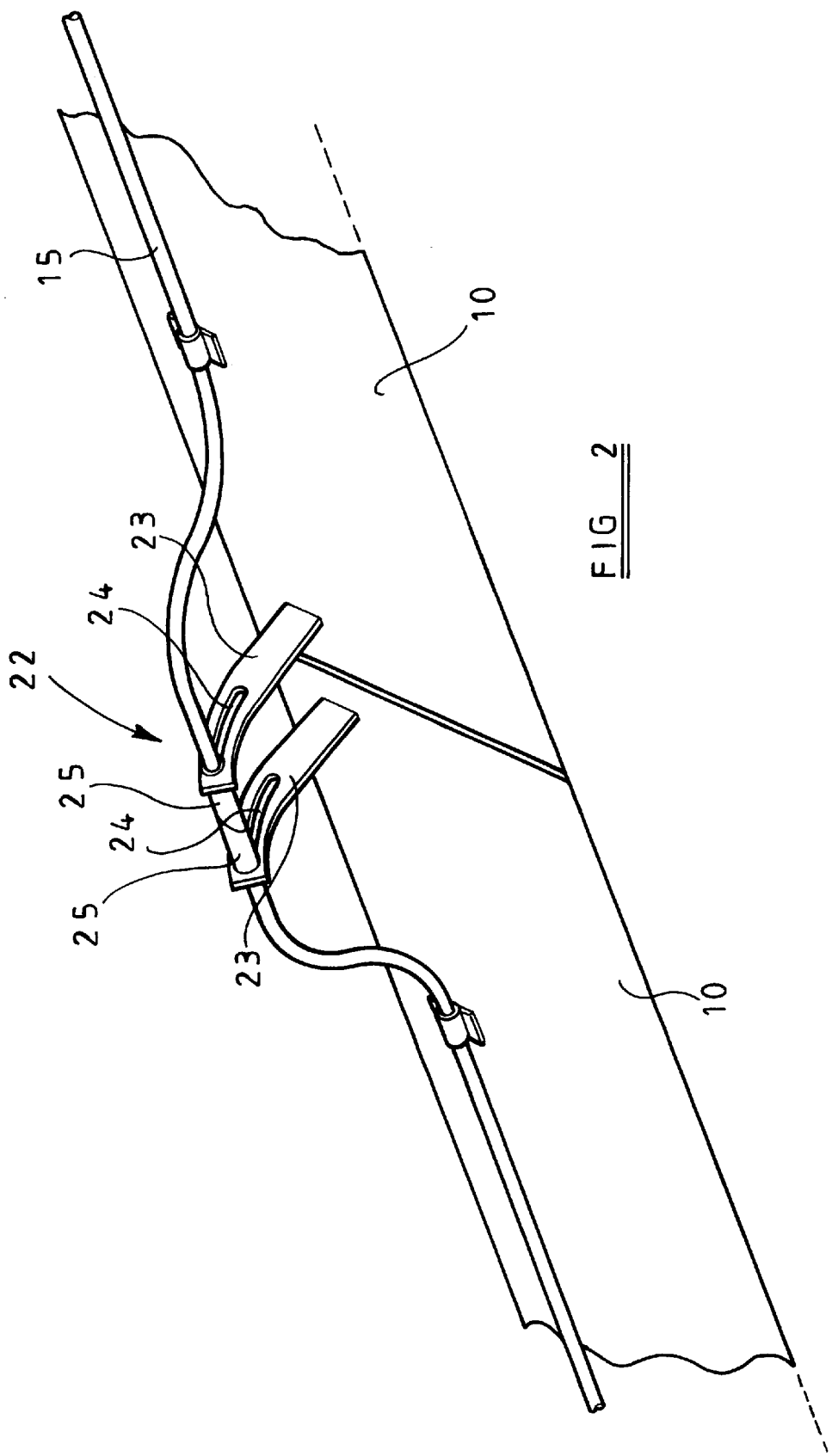
FIG. 2 is a diagram to an enlarged scale illustrating part of the detection apparatus.

FIGS. 1 and 2 of the accompanying drawings illustrate, diagrammatically, a leading edge high lift surface system of an aircraft wing. The system comprises a plurality of leading edge high lift surfaces 10 each of which is mounted upon the aircraft wing in such a manner as to be pivotable about an axis 11. Each of the surfaces 10 is pivotable between a rest position and an operative position, each surface 10 being moveable by a pair of actuators 12, the actuators 12 being driven by a common drive shaft 13 which, in turn, is powered by a power drive unit 14. In the illustrated embodiment, the wing is provided with seven such surfaces 10, and so fourteen actuators 12 are used.

Extending across each of the surfaces 10 at a position spaced slightly from the edge thereof remote from the axis 11 is a signal transmission means in the form of an optical fibre 15 which is encased within a protective carbon fibre reinforced plastics sleeve, the sleeve being arranged to protect the optical fibre from the atmospheric conditions in which the detection apparatus will be used. The optical fibre 15 is in the form of a single continuous length which extends across all seven of the surfaces 10. At one end, the optical fibre 15 is spliced to a second optical fibre 16 through a splicer 17. The second optical fibre 16 is connected to an appropriate signal generator, for example an appropriately controlled light emitting diode arrangement 18. The other end of the optical fibre 15 is spliced through a splicer 19 to a third optical fibre 20 which, in turn, is connected to an appropriate receiver or detector 21 arranged to sense the transmission of signals along the optical fibre 15 from the light emitting diode 18.

As illustrated most clearly in FIG. 2, a signal interruption arrangement 22 is associated with adjacent pairs of surfaces 10. In the illustrated embodiment, as there are seven surfaces 10, it will be appreciated that six signal interruption arrangements 22 are provided. Each signal interruption arrangement 22 comprises a pair of brackets 23, one bracket 23 of each pair being mounted upon each of the adjacent surfaces 10. Each bracket 23 is provided with an arcuate slot 24 within which a respective component 25 is slidable, the fibre 15 being provided with sufficient slack to allow such movement to occur. The components 25 are rotatable within the slots 24, the components 25 each being of tubular form and cooperating with one another in a plane which is angled to the axis of the components 25. As illustrated, the sleeved optical fibre 15 extends through the components 25.

In normal operation of the leading edge high lift surface system, in order to move the surfaces from their rest positions to their operative positions, the motor 14 is operated to rotate the drive shaft 13 which in turn causes extension of the actuators 12, the actuators 12 operating to move the surfaces 10, pivoting the surfaces 10 about the axis 11 to their operative positions. Although ideally the surfaces 10 should move simultaneously, it will be appreciated that there is likely to be a small degree of relative movement between the surfaces 10 resulting from slack within the actuator system. As a result of the relative movement between the surfaces 10, the components 25 may ride within the slots 24 provided in the brackets 23, the relative movement being insufficient to cause each component 25 to reach an end of the range of permitted travel thereof as defined by the ends of the slots 24. Provided the level of relative movement between the surfaces 10 does not exceed the permitted level, it will be appreciated that a signal transmitted by the light emitting diode 18 is transmitted along the length of the optical fibre 15, and the signal can be received by the receiver 21. The reception of the signal by the receiver 21 indicates that no skew or asymmetry has occurred. Such operation is illustrated in FIG. 3(a).

In the event that one of the actuators adjacent a joint between adjacent surfaces 10 fails, then relative movement between the adjacent surfaces 10 will occur, and the level of relative movement will be sufficient to result in the components 25 reaching the ends of their permitted range of travel as defined by the slots 24. Once the components 25 reach the ends of the slots 24, it will be appreciated that further relative movement of the surfaces 10 will result in the application of a lateral force to the optical fibre 15 by the components 25, and the force will reach a level beyond which the optical fibre 15 will sheer. Such a position is illustrated in part (b) of FIG. 3. Clearly, upon the optical fibre fracturing, a signal transmitted by the light emitting diode 18 is no longer able to reach the receiver 21. The failure of the receiver 21 to receive a signal transmitted by the light emitting diode 18 is used to provide a signal indicative of the presence of a skew or asymmetry within the leading edge high lift surface system.

In the event of relative movement of the adjacent surfaces 10, should the components 25 occupy angular positions in which the plane of cooperation between the components 25 prevents further relative movement of the surfaces 10, then the components 25 will rotate within the slots 24 to a position of least resistance in which further relative movement of the surfaces 10 can occur, and in which the optical fibre 15 will break.

In the event that one of the actuators which is not located adjacent the intersection of two of the surfaces 10 fails or in the event that only the end actuators move, then depending upon the direction of movement of the remainder of the surfaces 10, either the situation illustrated in FIG. 3(c) or that illustrated in FIG. 3(d) will occur. FIG. 3(c) illustrates the case where one of the end actuators has failed, the remaining actuators 12 being used to move the surfaces 10 from their rest position to their operative positions. Clearly, the failure of the actuator results in the end surface 10 becoming skewed, and this movement results in the bracket 23 associated with that surface 10 moving angularly away from the bracket 23 of the adjacent surface. As a result of the relative movement of the brackets 23, the components 25 separate from one another, causing failure of the optical fibre 15, hence resulting in the receiver 21 being unable to sense a signal transmitted by the light emitting diode 18 and in the production of a signal indicative of a skew or asymmetry condition. FIG. 3(d) illustrates the case where the failure of the actuator results in the brackets 23 moving angularly relative to one another, the brackets 23 moving towards one another. In such a condition, the components 25 ride over one another as a result of the angled plane of cooperation between the components, the movement of the components 25 resulting in failure of the optical fibre 15 and hence permitting detection of the presence of a skew or asymmetry condition. As described hereinbefore, rotation of the components 25 may occur prior to failure of the optical fibre 15.

It will be appreciated that in order to permit detection of skew conditions resulting from the failure of an end one of the actuators, the brackets must be of sufficient strength to transmit the angular movement thereof towards or away from the bracket of the adjacent surface to the optical fibre 15 and to cause failure of the optical fibre 15.

In the event that both of the actuators 12 associated with one of the surfaces 10 fail, then the condition illustrated in FIG. 3(e) will arise. As illustrated in FIG. 3(e), the components 25 move away from one another once they reach the end of the their permitted travel within the slots 24, the separation of the components 25 resulting in failure of the optical fibre 15, and hence in the production of a signal indicative of the presence of a skew or asymmetry condition.

The slack in the fibre 15 reduces the risk of failure of the fibre 15 resulting from normal bending of the wing, in use.

Although in the description hereinbefore, the signal transmission means takes the form of an optical fibre, it will be appreciated that the optical fibre could be replaced by an electrically conductive wire, appropriate signal generation means and receiver means being used to generate and receive appropriate electrical signals. Further, if desired the signal interruption means 22 may be modified to take the form of a plug and socket arrangement, the plug and socket being arranged to separate from one another upon relative movement of the surfaces 10 occurring, such separation resulting in the generation of a signal indicative of a skew or a asymmetry condition. In such an arrangement, rather than providing a single optical fibre 15 or electrically conductive wire extending across all of the surfaces 10, it will be appreciated that the signal transmission means will be made up of a plurality of segments which are connected to each other by the signal interruption means. In such an arrangement, upon the fault giving rise to the skew or asymmetry condition being rectified, the plug and socket arrangement may be arranged to reconnect the segments of the signal transmission means thus permitting the generation of a signal indicative of the correction of the fault, the detection apparatus then being reset and capable of detecting further faults, should such faults arise.

In the event that a skew or asymmetry condition is detected, then the signal which is produced is conveniently used to alert the flight control computer of the presence of the condition to permit stall warning levels to be reset. The drive to the leading edge high lift system may also be shut down, continued drive to the system possibly resulting in one or more of the surfaces becoming detached or in damage to other parts of the aircraft, and possibly resulting in the surfaces of the system moving to positions in which the stability and control of the aircraft are adversely affected.

The system described hereinbefore will not provide a signal indicative of a fault condition in the event that the part of the drive shaft 13 between the power drive unit 14 and the actuator 12 closest to the power drive unit 14 fails. In order to permit detection of such faults, the apparatus may include additional sensors, possibly fuselage mounted sensors, arranged to monitor movement of the surface 10 associated with the actuator 12 closest to the power drive unit 14, the output of the additional sensor(s) being used to flag the presence of a fault if the power drive unit 14 is operating but corresponding movement of the surface is not occurring.

I claim:

1. A high lift system of an aircraft wing having a plurality of moveable high lift surfaces, said system including a detection apparatus comprising a signal transmission apparatus extending across each said surface, a signal generator, a signal receiver and a signal interruptor associated with adjacent ones of said surfaces and arranged to interrupt transmission of a signal along said signal transmission apparatus upon relative movement of said adjacent ones of said surfaces occurring.

2. A high lift system as claimed in claim 1, wherein the high lift moveable surfaces are leading edge high lift surfaces.

3. A high lift system as claimed in claim 1, wherein said signal interrupter is arranged to permit a small amount of relative movement without interrupting said transmission of a signal along said signal transmission apparatus.

4. A high lift system as claimed in claim 1, wherein said signal transmission apparatus comprises an optical fibre.

5. A high lift system as claimed in claim 1, wherein said signal transmission apparatus comprises an electrically conductive wire.

6. A high lift system as claimed in claim 1, wherein said signal transmission apparatus is provided with a protective sleeve.

7. A high lift system as claimed in claim 1, wherein said signal transmission apparatus is composed of a plurality of segments, each segment extending across a respective one of said surfaces, said signal interruption apparatus comprising plug and socket arrangements arranged to become disconnected upon relative movement of adjacent said surfaces occurring.

8. A high lift system as claimed in claim 1, wherein said signal transmission apparatus is continuous, said signal interrupter being arranged to break said signal transmission apparatus in the event of relative movement of adjacent ones of said surfaces occurring.

9. A high lift system as claimed in claim 1, wherein said signal interruption apparatus comprises a first component carried by a bracket associated with one of said surfaces, and a second component carried by a bracket associated with an adjacent one of said surfaces.

10. A high lift system as claimed in claim 9, wherein said brackets are provided with slots within which said components can slide to permit a limited amount of relative movement of said surfaces to occur without interrupting said signal.

11. A high lift system as claimed in claim 9, wherein said components are rotatable relative to said brackets.

12. A high lift system as claimed in claim 9, wherein said components are arranged to cooperate with one another along a plane angled relative to axes of said components.

\* \* \* \* \*